US008228385B2

(12) United States Patent
Keyhl et al.

(10) Patent No.: US 8,228,385 B2
(45) Date of Patent: Jul. 24, 2012

(54) APPARATUS FOR DETERMINING INFORMATION IN ORDER TO TEMPORALLY ALIGN TWO INFORMATION SIGNALS

(75) Inventors: Michael Keyhl, Heroldsberg (DE); Christian Schmidmer, Nuremberg (DE); Roland Bitto, Nuremberg (DE)

(73) Assignee: Opticom GmbH, Erlangen (DE)

( * ) Notice: Subject to any disclaimer, the term of this patent is extended or adjusted under 35 U.S.C. 154(b) by 363 days.

(21) Appl. No.: 12/442,067

(22) PCT Filed: Sep. 21, 2007

(86) PCT No.: PCT/EP2007/008252
§ 371 (c)(1),
(2), (4) Date: Jan. 12, 2010

(87) PCT Pub. No.: WO2008/034632
PCT Pub. Date: Mar. 27, 2008

(65) Prior Publication Data
US 2010/0141774 A1 Jun. 10, 2010

(30) Foreign Application Priority Data
Sep. 22, 2006 (DE) .......................... 10 2006 044 929

(51) Int. Cl.
*H04N 17/00* (2006.01)
*H04N 17/02* (2006.01)
(52) U.S. Cl. .......... 348/180; 348/190; 348/181; 702/71; 714/715; 714/819
(58) Field of Classification Search .................. 348/180, 348/190, 181; 702/71; 714/715, 819
See application file for complete search history.

(56) References Cited

U.S. PATENT DOCUMENTS
6,259,477 B1 * 7/2001 Hu .................................. 348/180
(Continued)

FOREIGN PATENT DOCUMENTS
DE 4309957 C1 7/1994
(Continued)

OTHER PUBLICATIONS
Rix, et al.; "PESQ-the new ITU standard for end-to-end speech quality assessment"; Sep. 22-25, 2000; AES 109th Convention, Los Angeles, CA USA, pp. 1-18.
(Continued)

*Primary Examiner* — Jefferey Harold
*Assistant Examiner* — Mustafizur Rahman
(74) *Attorney, Agent, or Firm* — Michael A. Glenn; Glenn Patent Group (57) ABSTRACT

An apparatus for determining information in order to temporally align first and second information signals, each including one or several information values for successive sampling times, the apparatus including a characteristic extractor for extracting a characteristic per sampling time or per subsequence of sampling times from the first information signal within a first search pattern to obtain a first characteristic curve, and for extracting the characteristic per sampling time or per subsequence of sampling times from the second information signal within a second search pattern to obtain a second characteristic curve and a determiner for determining the information for temporal alignment based on similarities between the first and second characteristic curves of the characteristic by means of a first search for a search pattern from one of the first and second characteristic curves of the characteristic within the other of the first and second characteristic curves of the characteristic.

20 Claims, 7 Drawing Sheets

U.S. PATENT DOCUMENTS

| | | | |
|---|---|---|---|
| 6,496,221 B1 * | 12/2002 | Wolf et al. | 348/192 |
| 6,549,757 B1 | 4/2003 | Masse et al. | |
| 6,751,360 B1 | 6/2004 | Lu | |
| 7,133,066 B2 * | 11/2006 | Bourret | 348/180 |
| 7,233,349 B2 * | 6/2007 | Mauger et al. | 348/184 |
| 7,586,515 B2 * | 9/2009 | Straney et al. | 348/190 |
| 7,705,881 B2 * | 4/2010 | Okamoto et al. | 348/180 |

FOREIGN PATENT DOCUMENTS

| | | |
|---|---|---|
| EP | 0372155 A2 | 6/1990 |
| EP | 1104924 | 6/2001 |
| WO | WO 2008/034632 | 3/2008 |

OTHER PUBLICATIONS

Tallak, et al.; "Time Delay Estimation for Objective Quality Evaluation of Low Bit-Rate Coded Speech with Noisy Channel Conditions"; 1993, IEEE, pp. 1216-1219.

International Telecommunication Union "Series P: Telephone Transmission Quality, Telephone Installations, Local Line Networks—Methods for objective and subjective assessment of quality—Perceptual evaluation of speech quality (PESQ); An objective method for end-to-end speech quality assessment of narrow-band telephone networks and speech codecs"; ITU-T Recommendation p. 862, Feb. 2001.

Bloom, P.J.; "Use of Dynamic Programming for Automatic Synchronization of Two Similar Speech Signals"; 1984; IEEE International Conference on Acoustics, Speech and Signal Processing, vol. 9, Part 1, pp. 69-72.

Hekstra, et al.; "PVQM—A perceptual video quality measure"; Mar. 2002; Signal Processing: Image Communication vol. 17, pp. 781-798, Elsevier.

ITU Radiocommunication Assembly; "Method for objective measurements of perceived audio quality"; 1998-2001; Recommenddation ITU-R Bs.1387-1.

* cited by examiner

APPARATUS FOR DETERMINING INFORMATION IN ORDER TO TEMPORALLY ALIGN TWO INFORMATION SIGNALS

CROSS-REFERENCE TO RELATED APPLICATIONS

This application is a U.S. national entry of PCT Patent Application Serial No. PCT/EP2007/008252 filed 21 Sep. 2007, and claims priority to German Patent Application No. 102006044929.0 filed 22 Sep. 2006, each of which is incorporated herein by reference.

BACKGROUND

The present invention relates to a concept for determining information in order to temporally align two information signals, in particular a disturbed information signal and an undisturbed information signal, which may be employed, for example, for performing so-called objective measurements for evaluating the quality of signals.

Nowadays, standardized perception-based measurement techniques (perceptual measurements) are employed for metrologically assessing the quality of encoded audio or video signals. Known methods include, for example, the so-called PESQ (perceptual evaluation of speech quality) technique, which is described in the standardization document ITU-T P.862. Another known measurement technique for evaluating the quality of audio signals is the so-called. PEAQ (objective measurement of perceived audio quality) technique, and is represented in the standardization document ITU-RBS.1387-1. A measurement technique for evaluating video signals is described in A. P. Hekstra et al., "PVQM—A perceptual video quality measure", in Signal Processing: Image Communications, 2002, Vol. 17, pp. 781-798, Elsevier.

These methods, or further methods, of evaluating the quality of audio or video signals have in common that a signal to be tested or to be evaluated, which typically is the output signal of a system or network or, generally, of an element to be examined, is compared to an original or reference signal, which typically is the signal input into the element to be examined.

In the past, test were performed using test persons in order to assess or evaluate a specific transmission technique or encoder. Depending on the application, these tests are auditory tests, for example, for testing hearing-adapted digital encoding techniques, or visual tests for testing digital video encoding techniques. Even though, on average, these tests provide relatively reliable results, there is nevertheless a subjective component. In addition, such subjective tests involving a specific number of test persons entail a relatively large amount of effort and are therefore relatively expensive. Therefore, objective measurement techniques for assessing the quality of encoded speech, audio or video signals have been developed.

Figure 7:
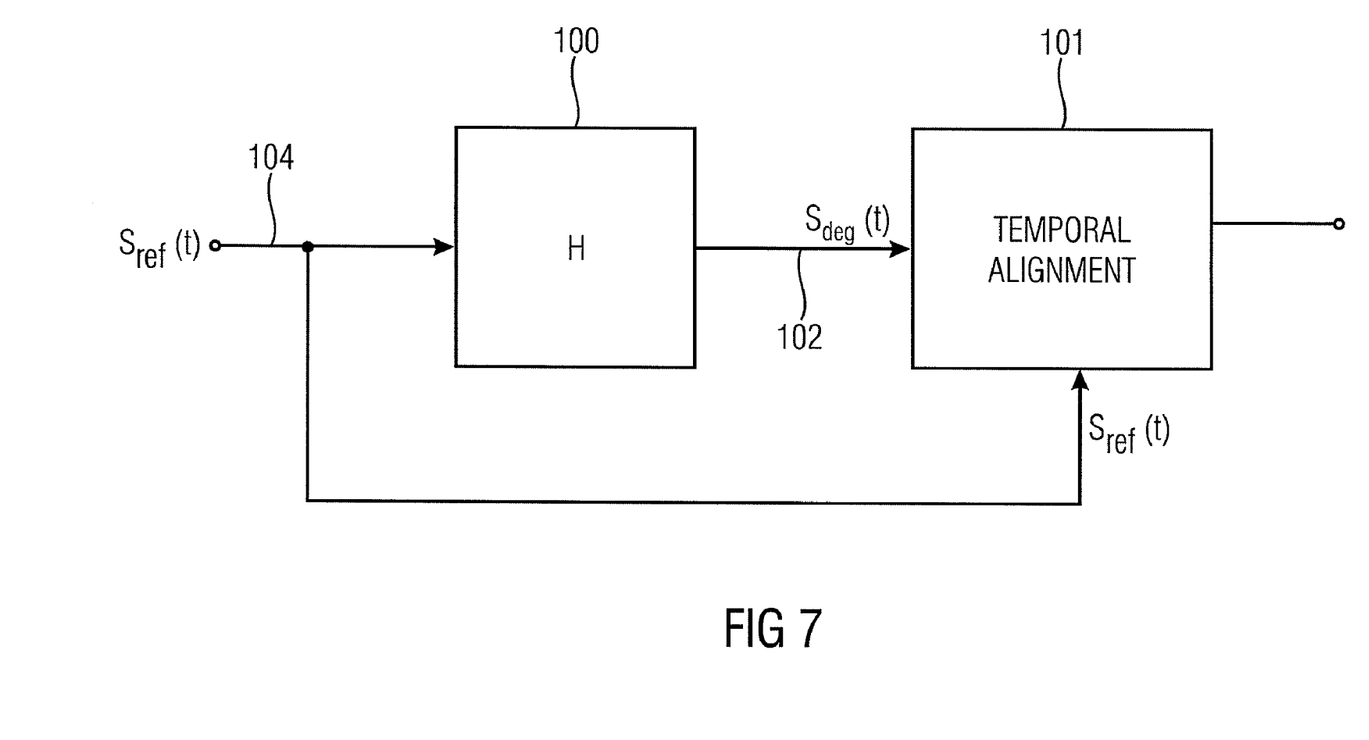
FIG. 7 shows a block diagram in order to illustrate a full reference-based, intrusive measurement in order to assess the quality of an impaired signal.

Part of a setup of such an objective measurement technique is depicted in FIG. 7. The original signal or reference signal $S_{ref}(t)$, 104 is fed into a system 100 at a transmission characteristic H. A signal $S_{deg}(t)$, 102, which comprises signal properties or characteristics as compared to the original signal $S_{ref}(t)$ which have been modified by the system 100, is provided the output of the system 100. The first information signal $S_{deg}(t)$ and the second information signal $S_{ref}(t)$ are fed to a block 110 so as to temporally align or to temporally match the two signals to each other. In this manner it can be ensured that, for example with video signals, only those images or frames are compared to one another which temporally correspond to one another. Temporal alignment or the sequence of the two signals could be disturbed, for example, by a delay, a frame loss or a frame repetition. For quality evaluation of the disturbed or impaired signal $S_{deg}(t)$ it is important for the temporal alignment of $S_{ref}(t)$ to be performed with high accuracy and precision, since a subsequent comparison of two non-corresponding frames of $S_{deg}(t)$ and $S_{ref}(t)$ will generally lead to an underestimation of the video quality of the disturbed signal $S_{deg}(t)$. A correlation of such an objective quality evaluation to a subjective quality evaluation performed by, e.g., human viewers would be accordingly low.

Modern transmission techniques for, e.g., video, audio or speech signals frequently change the temporal structure of the information contained within a data stream. Sometimes this may be intentional, but more frequently this behavior is caused by transmission disturbances. Additionally, the signals are frequently disturbed by transmission and source encoding. Numerous applications, for example of metrology, involve a comparison of the transmitted signal $S_{deg}(t)$ with the undisturbed signal $S_{ref}(t)$. As was already described above, however, this comparison entails correct temporal association of the individual signal portions from the undisturbed signal $S_{ref}(t)$ and the disturbed signal $S_{deg}(t)$. With small disturbances and information streams structured in a relatively simple manner, such as speech signals, for example, simple techniques may be employed which are based on direct correlation of the two signals. With more complex signals, such as video signals, and high-level disturbances as occur, e.g., in mobile radio communication or internet telephony, said methods cannot be reliably applied and furthermore entail an extremely large amount of computing time.

SUMMARY

According to an embodiment, an apparatus for determining information in order to temporally align a first information signal and a second information signal, each of which includes one or several information values for successive sampling times, may have: a characteristic extractor for extracting a characteristic per sampling time or per subsequence of sampling times of the successive sampling times from the first information signal within a first search pattern so as to obtain a first characteristic curve, and for extracting the characteristic per sampling time or per subsequence of sampling times of the successive sampling times from the second information signal within a second search pattern so as to obtain a second characteristic curve, the characteristic extractor being configured to extract the characteristic from a plurality of characteristics per sampling time or per subsequence of sampling times, so that the characteristic includes characteristic properties which by comparison with characteristic properties of other characteristics indicate an increased level of success in the search for the search pattern from one of the first and second characteristic curves of the characteristic; and a determiner for determining the information for temporal alignment on the basis of similarities between the first and second characteristic curves by means of a first search for a search pattern from one of the first and second characteristic curves within the other of the first and second characteristic curves.

According to another embodiment, a method of determining information in order to temporally align a first information signal and a second information signal, each of which includes one or several information values for successive sampling times, may have the steps of: extracting a characteristic per sampling time or per subsequence of sampling times of the successive sampling times from the first information signal within a first search pattern so as to obtain a first characteristic curve, and for extracting the characteristic per sampling time or per subsequence of sampling times of the successive sampling times from the second information signal within a second search pattern so as to obtain a second characteristic curve, the characteristic being extracted from a plurality of characteristics so that the characteristic includes characteristic properties which by comparison with characteristic properties of other characteristics indicate an increased level of success in the search for the search pattern from one of the first and second characteristic curves of the characteristic; and determining the information for temporal alignment on the basis of similarities between the first and second characteristic curves of the characteristic by means of a first search for a search pattern from one of the first and second characteristic curves of the characteristic within the other of the first and second characteristic curves of the characteristic.

According to another embodiment, a computer program may have a program code for performing the method of determining information in order to temporally align a first information signal and a second information signal, each of which includes one or several information values for successive sampling times, wherein the method may have the steps of: extracting a characteristic per sampling time or per subsequence of sampling times of the successive sampling times from the first information signal within a first search pattern so as to obtain a first characteristic curve, and for extracting the characteristic per sampling time or per subsequence of sampling times of the successive sampling times from the second information signal within a second search pattern so as to obtain a second characteristic curve, the characteristic being extracted from a plurality of characteristics so that the characteristic includes characteristic properties which by comparison with characteristic properties of other characteristics indicate an increased level of success in the search for the search pattern from one of the first and second characteristic curves of the characteristic; and determining the information for temporal alignment on the basis of similarities between the first and second characteristic curves of the characteristic by means of a first search for a search pattern from one of the first and second characteristic curves of the characteristic within the other of the first and second characteristic curves of the characteristic, when the computer program runs on a computer.

The present invention is based on the finding that temporal association of individual signal portions from a first information signal with a second information signal may be conducted such that rather than examining the information signal streams themselves, characteristics obtained from the information signal streams are examined.

To this end, a first step comprises decomposing the first and second information signal streams in subunits, respectively.

A next step comprises characterizing each subunit of the first and second information signals by at least one characteristic, respectively. This results in characteristic vectors in each case, one individual element of a characteristic vector representing a characteristic of a subunit of the information signal stream. The number of elements of a characteristic vector describes the number of subunits of an information signal stream. In accordance with embodiments of the present invention, each subunit of an information signal stream may be characterized by a plurality of characteristics. In this event, a plurality of characteristic vectors will result, each of the characteristic vectors representing a different characteristic of the plurality of subunits of an information stream.

A further step comprises subdividing a characteristic vector of the first, or disturbed, information signal into search patterns, or comparison time windows, comprising several sampling times or several subsequences of sampling times of the disturbed information signal. In accordance with an embodiment of the present invention, the search patterns, or the comparison time windows, may be provided by subdividing the characteristic vector into equidistant portions.

A further step comprises examining, in accordance with an embodiment of the present invention, a similarity of the search patterns, or comparison time windows, of the disturbed information signal $S_{deg}(t)$ to individual portions of a corresponding characteristic vector of the second information signal, or reference signal, $S_{ref}(t)$ by means of a cross-correlation. The position of the maximum or the cross-correlation function between the search pattern and the characteristic vector determines the shift of the search pattern within the characteristic vector. In addition, the value of the maximum is a measure of the match or similarity of the search pattern and the corresponding comparison time window, or subspace, from the characteristic vector of the reference signal $S_{ref}(t)$.

If a search for a search pattern which is obtained, for example, from a specific characteristic vector of the disturbed information signal $S_{deg}(t)$ is not successful, a search for a search pattern from a different characteristic vector of the disturbed information signal $S_{deg}(t)$ may be repeated in accordance with a further embodiment of the present invention.

In accordance with a further embodiment of the present invention, a search pattern may also be formed from the characteristic vector of the reference signal $S_{ref}(t)$, and this search pattern may be searched for within the characteristic vector of the disturbed information signal $S_{deg}(t)$.

In accordance with a further embodiment of the present invention, determining information in order to temporally align the first and second information signals may be followed by a further step of determining even more detailed information for temporal alignment, which involves observing temporal alignment within the length of a search pattern. Conventional methods, such as so-called block-matching algorithms (BMA) or a phase correlation method, may be utilized for determining the even more detailed information within the length of the search pattern.

An advantage of the present invention is that for temporal alignment, what is examined is not the information signals themselves, but rather characteristics obtained from the information signals. For complex information signals, this signifies a large-scale reduction of complexity, which results in that an advantage may be achieved as far as the computing time associated with the examination is concerned.

A further advantage of the present invention consists in that, by using several characteristics per subunit, the level of reliability of the inventive concept may be increased even further in that, for example, for each subunit the most suitable characteristic is selected in each case. Therefore, an increase in accuracy may be achieved, since the characteristics, or the meta-information, may be adapted to a set task in a considerably more specific manner than is enabled by a direct comparison of two information signals.

BRIEF DESCRIPTION OF THE DRAWINGS

Embodiments of the present invention will be detailed subsequently referring to the appended drawings, in which.

DETAILED DESCRIPTION OF THE INVENTION

With regard to the following description, it should be noted that, in the various embodiments, functional elements which are identical or have identical actions will have identical reference numerals, and that, as a result, the descriptions of said functional elements will be mutually interchangeable in the various embodiments presented below.

In addition, it should be noted that the meanings of the first and second information signals will be interchangeable below. As opposed to what will be stated below, the first information signal could therefore also be the undisturbed reference signal $S_{ref}(t)$, in which case the second information signal consequently would be the disturbed information signal $S_{deg}(t)$.

Figure 1:
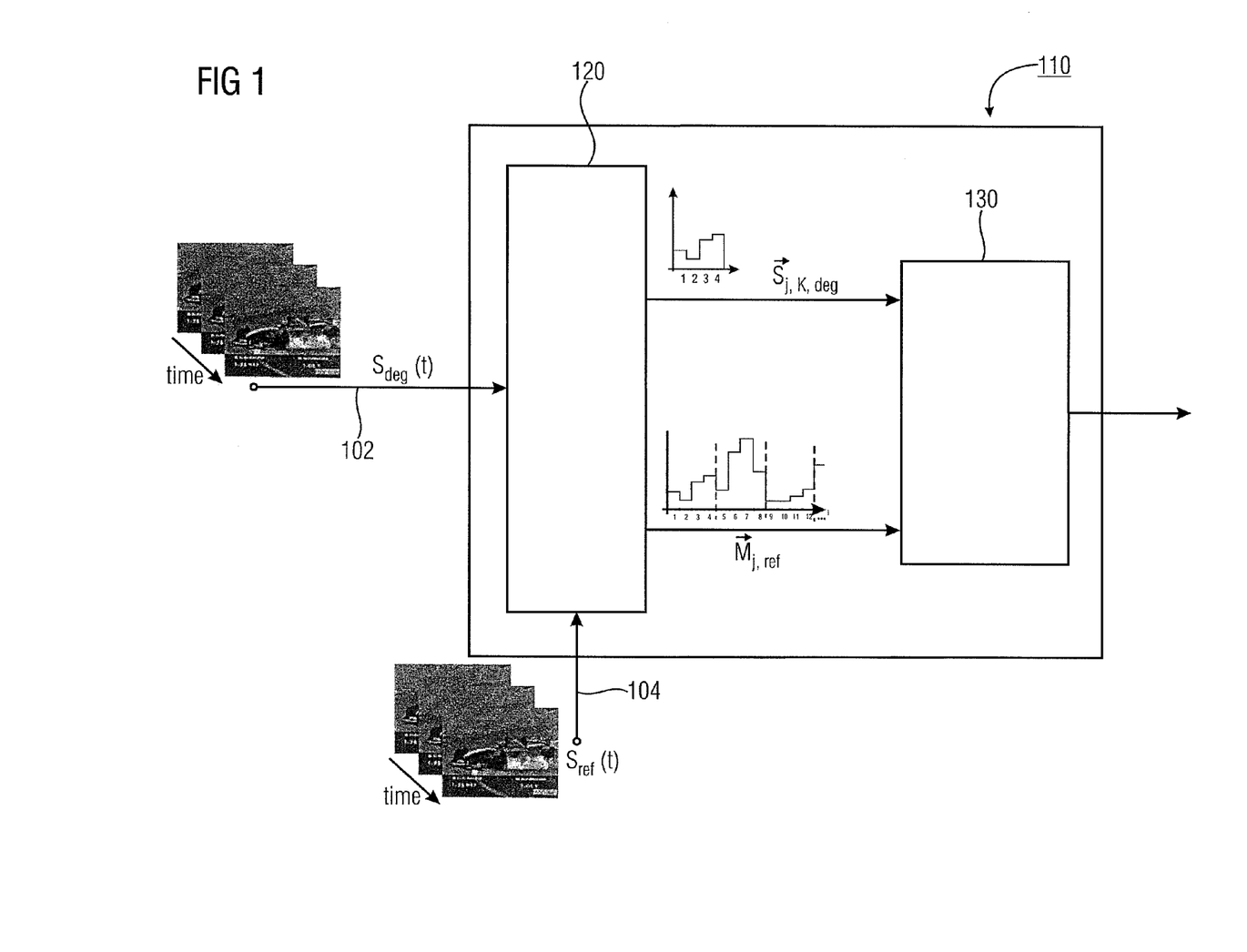
FIG. 1 shows an apparatus for determining information in order to temporally align a first information signal and a second information signal in accordance with an embodiment of the present invention.

FIG. 1 shows an apparatus 110 for determining information in order to temporally align a first information signal $S_{deg}(t)$ 102 and a second information signal $S_{ref}(t)$ 104 comprising a characteristic extraction means 120 and a means 130 for determining the information for temporal alignment.

The first information signal $S_{deg}(t)$ and the second information signal $S_{ref}(t)$ are fed to the characteristic extraction means 120 so that the characteristic extraction means 120 may provide at least one characteristic value $M_{i,deg}$ per sampling time i or per subsequence i of sampling times of successive sampling times from the first information signal $S_{deg}(t)$ within a first comparison time window, which includes several sampling times or subsequences. Likewise, the characteristic extraction means 120 extracts at least one characteristic value $M_{i,ref}$ per sampling time i or per subsequence i of sampling times of the successive sampling times from the second information signal $S_{ref}(t)$ within a second comparison time window, which includes several sampling times or subsequences.

In accordance with an embodiment of the present invention, the first information signal $S_{deg}(t)$ corresponds to a disturbed information signal, and the second information signal $S_{ref}(t)$ corresponds to an undisturbed, or reference, information signal. The characteristic extraction means 120 thus decomposes both the undisturbed and the disturbed information stream into subunits $U_{i,ref}$ and $U_{i,deg}$. In this context, the subunits may correspond to sampling times or to a subsequence of sampling times of successive sampling times, successive sampling times each comprising one or several information values.

If the information signals are video sequences, for example, a subunit $U_{i,ref}$ will correspond, for example, to the $i^{th}$ image of the undisturbed reference signal $S_{ref}(t)$, the $i^{th}$ image corresponding to the $i^{th}$ sampling time. As was already described above, however, a subunit might also comprise a plurality of images and, therefore, a plurality of sampling times.

If the two information signals are audio signals (music or speech signals), a subunit $U_{i,ref}$ will correspond, for example, to a specific number of samples of the digitized reference audio stream.

Each subunit $U_{i,xxx}$ ("xxx" stands for "deg" or "ref", respectively) is characterized, in the characteristic extraction means 120, by at least one characteristic $M_{i,xxx}$. In accordance with an embodiment of the present invention, the characteristic extraction means 120 extracts, for each subunit $U_{i,xxx}$ of the undisturbed or of the disturbed information stream, not only one characteristic, but a plurality of characteristic values $M_{i,j,ref}$ and $M_{i,j,deg}$, respectively. The index j designates the respective characteristic of the plurality of characteristic values. This connection will be explained in more detail with reference to FIG. 2.

Figure 2:
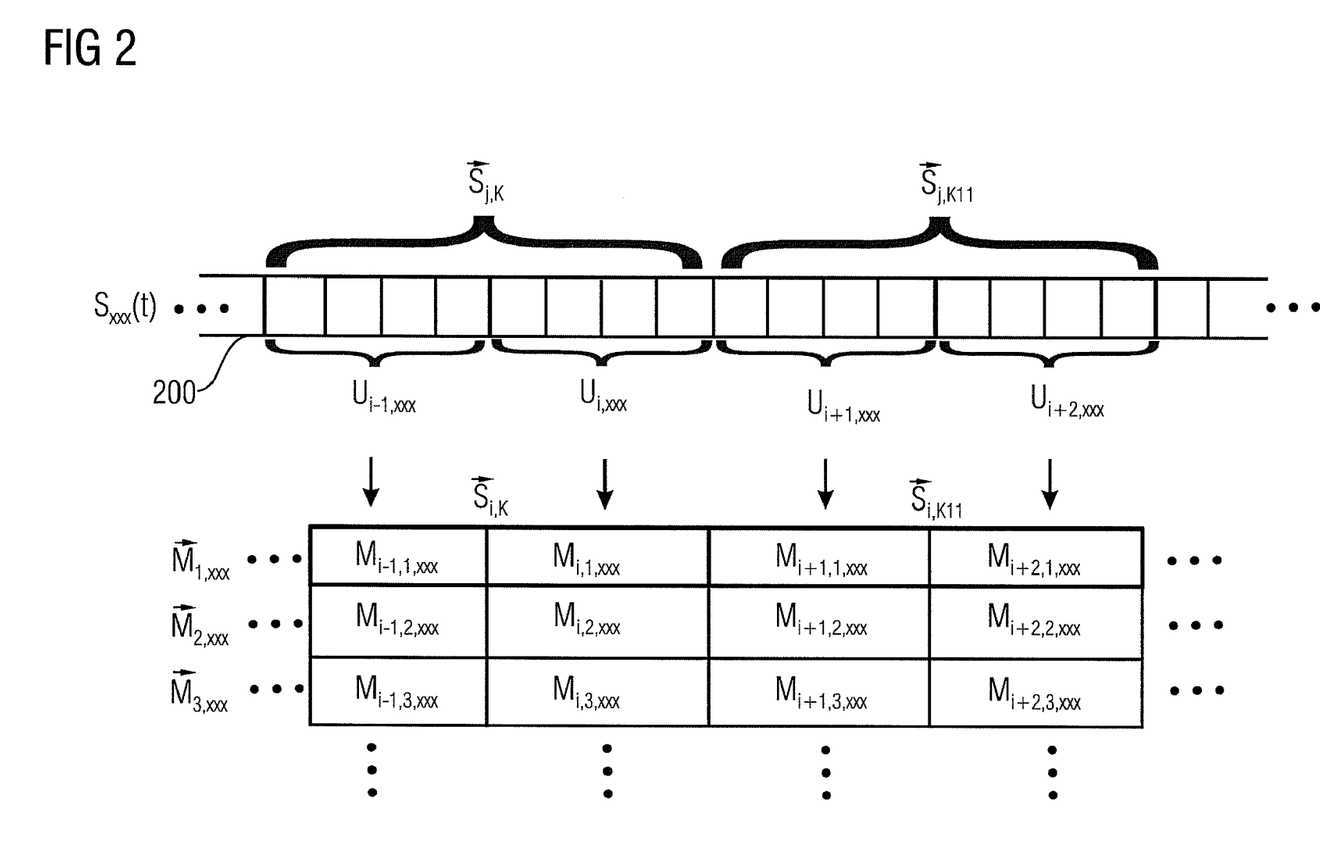
FIG. 2 shows a schematic representation of a process flow of extracting characteristic values of an information signal in accordance with an embodiment of the present invention.

In this context, FIG. 2 schematically shows a section 200 of one of the two information signals $S_{deg}(t)$ or $S_{ref}(t)$, which portion is marked by $S_{xxx}(t)$. The information signal $S_{xxx}(t)$ is decomposed into a plurality of subunits $U_{i,xxx}$. A subunit $U_{i,xxx}$ in each case corresponds to a sampling time i or to a subsequence i of sampling times, successive sampling times each comprising one or several information values.

If, thus, a subunit $U_{i,xxx}$ depicted in FIG. 2 corresponds to a sampling time in each case, each sampling time will comprise, in the scenario depicted in FIG. 2, four information values. However, if each of the information values shown in FIG. 2 corresponds to precisely one sampling time, a subsequence of four sampling times each will correspond, in the scenario depicted in FIG. 2, to a subportion $U_{i,xxx}$. It shall be noted that FIG. 2 only serves to illustrate the inventive concept and is therefore depicted in a highly simplified manner. In real applications, such as the quality evaluation of video signals, an information signal for a sampling time will comprise a multitude of information values which may be used, for example, for representing an image.

As was already described above, one or a plurality of characteristic values $M_{i,j,xxx}$ may be associated with the individual subunits $U_{i,xxx}$, respectively. The index i designates the respective subunit, and the index j designates the respective characteristic.

Figure 3:
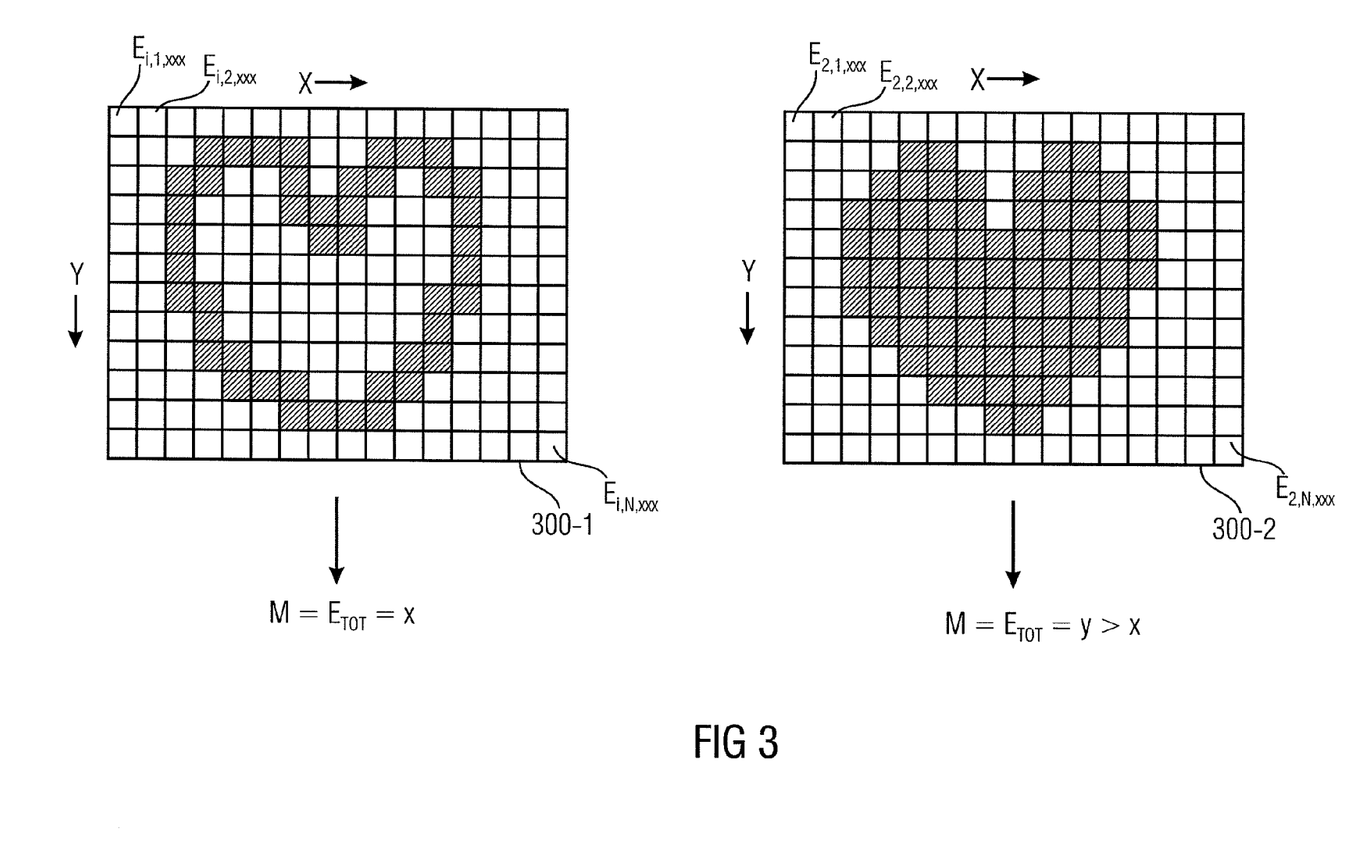
FIG. 3 shows a schematic representation in order to illustrate the formation of a characteristic value into an image information signal in accordance with an embodiment of the present invention.

In accordance with an embodiment of the present invention, a characteristic may be, e.g., the entire energy contained within the subunit $U_{i,xxx}$. Therefore, if a subunit $U_{i,xxx}$ exhibits, e.g., N information values, each of which comprises an energy $E_{i,n,xxx}$ (n=1, ..., N), the total energy per subunit i may be determined in accordance with $$E_{i,xxx} = \sum_{n=1}^{N} E_{i,n,xxx},$$

wherein "xxx" stands for "deg" or "ref", respectively. Naturally, the entire energy may be brought into an "averaged" form by dividing it, e.g., by the number N of the contributing information values. With videos, the brightness, the color, a color component, a contrast, a saturation or the like may, of course, also be used instead of the energy. In this case the N contributing information values possibly do not comprise all of the pixels of the video images, but only some of them, such as a contiguous area, e.g. a rectangular area. This approach is schematically shown, by way of example, in terms of brightness with reference to FIG. 3.

By way of example, FIG. 3 shows a representation of two digitized images 300-1 and 300-2, wherein the individual information values of the two images each can adopt a value of 0 or 1 only (0=white, 1=black). If, rather than the respective image i itself, it is the overall brightness $E_{i,xxx}$ contained therein that is used—in an averaged or non-averaged form—as the characteristic or meta-information, a comparatively lower value will result for the overall brightness $E_{1,xxx}$ of the image 300-1 than for the overall brightness $E_{2,xxx}$ of the image 300-2. Therefore, the two images 300-1 and 300-2 may be unambiguously distinguished by the overall brightness $E_{i,xxx}$ of their information values, wherein in FIG. 3, by way of example, bright pixels are depicted in a dark manner, and, conversely, dark pixels are depicted to be white.

In accordance with further embodiments of the present invention, characteristics $M_{i,j,xxx}$ may also be, e.g., a share in movement in an image area, color values, contrast values, brightness values, or an energy within a specific spectral range, etc. The respective characteristic values $M_{i,j,xxx}$ may be summarized, for all of the subunits $U_{i,ref}$ and $U_{i,deg}$, respectively, into characteristic vectors $M_{i,ref}=[M_{i,1,ref}, M_{i,2,ref}, \ldots, M_{i,J,ref}]^T$ and $M_{j,ref}=[M_{1,j,ref}, M_{2,j,ref}, \ldots, M_{I,j,ref}]^T$ respectively, and $M_{i,deg}=[M_{i,1,deg}, M_{i,2,deg}, \ldots, M_{i,J,deg}]^T$ and $M_{j,deg}=[M_{1,j,deg}, M_{2,j,deg}, \ldots, M_{I,j,deg}]^T$, respectively, J designating the number of different characteristic values per subunit $U_{i,xxx}$, and I designating the number of subunits $U_{i,xxx}$. In principle, the characteristic vectors $M_{i,xxx}$ and $M_{j,xxx}$ respectively, contain a considerably smaller amount of information than the entire data of the subunits $U_{i,xxx}$. The characteristic vectors $M_{i,xxx}$ and $M_{j,xxx}$ may also be summarized into a characteristic matrix $M_{xxx}$, as is indicated in FIG. 2.

A characteristic vector $M_{j,xxx}$ is subdivided, in a next step, into comparison time windows or search patterns $S_{j,k,xxx}$, wherein the index k may comprise several subunits $U_{i,xxx}$. In the exemplary representation shown in FIG. 2, a comparison time window or a search pattern $S_{j,k,xxx}$ each comprises two subunits $U_{i,xxx}$. However, this representation is only exemplary, and the number of subunits $U_{i,xxx}$ actually used per comparison time window $S_{j,k,xxx}$ may generally be randomly selected. An optimum length of the search patterns $S_{j,k,xxx}$ depends on the individual application and the suitability of the characteristic vectors. One possibility of obtaining the comparison time windows or search patterns $S_{j,k,xxx}$ consists in subdividing a characteristic vector $M_{i,deg}$ of the disturbed information signal into equidistant portions, as is shown by way of example in FIG. 2. In accordance with an alternative embodiment of the present invention, however, it is also possible to perform subdivision into non-equidistant search patterns of different sizes. The search patterns need not directly adjoin or follow one another, but may also overlap. The subdivision may be performed by means of adaptive matching. In particular, the characteristic vector $M_{j,xxx}$ may also be divided in an iterative manner so as to obtain a search pattern $S_{j,k,xxx}$.

As was already described above, in accordance with an embodiment of the present invention, a search pattern or a comparison time window $S_{j,k,deg}$ is part, or a subspace, of a characteristic vector $M_{j,deg}$. In accordance with an embodiment of the present invention, this search pattern is searched for in the characteristic vector $M_{j,ref}$. In accordance with an embodiment of the present invention, the cross-correlation function (CCF) may be employed for the actual search. The discrete cross-correlation function of two discrete-time signals x[k] and y[k]

$$\phi_{xy}=E\{x[k]y^*[k-\lambda]\}$$

generally is a measure of the similarity of the two signals x[k] and y[k] for a temporal shift λ, λ designating a temporal shift in samples. If a search pattern or a comparison window $S_{j,k,xxx}$ has a length L, i.e. if it comprises L subunits $U_{i,xxx}$, and if a subdivision is performed in an equidistant manner, the search pattern will be composed of the following characteristic values:

$$S_{j,k,xxx}=[M_{kL,j,xxx}, \ldots, M_{(k+1)L-1,j,xxx}]^T$$

If the cross-correlation function $$CCF(M_{j,ref}, S_{j,k,deg}, \lambda) = \sum_{i=kL}^{(k+1)L-1} M_{i,j,deg} M^*_{i-\lambda,j,ref}$$

is employed for the actual search, an identification of discontinuities in the course of the disturbed signal $S_{deg}(t)$ may be performed by analyzing multiple maxima of the CCF ($M_{j,ref}$, $S_{j,k,deg}$, λ). Thus, if the CCF comprises more than one maximum of different temporal shifts λ, a discontinuity of the disturbed signal $S_{deg}(t)$ within the comparison time window or the search pattern $S_{j,k,deg}$ will be very likely, since part of $S_{j,k,deg}$ was found at a position $\lambda_1$ of the first maximum of the CCF, and a further part was found at the position $\lambda_2$ of the second maximum of the CCF. In addition, identification of discontinuities in the course of the disturbed signal $S_{deg}(t)$ may take place by analyzing the value of the maximum of the cross-correlation function CCF($M_{j,ref}$, $S_{j,k,deg}$, λ) or the magnitude of the cross-correlation function CCF($M_{j,ref}$, $S_{j,k,deg}$, λ). In these cases, the search pattern $S_{j,k,deg}$ is advantageously subdivided further in accordance with an embodiment of the present invention, $S_{j,k,deg}$ advantageously being divided between $\lambda_1$ and $\lambda_2$. This results in the search function being iteratively divided. In this context it is to be noted, however, that if the length L of the search patterns $S_{j,k,xxx}$ falls below a specific minimum magnitude, the search can no longer be performed successfully. At this time, however, the search is limited already to such an extent that classic methods such as block matching or phase correlation may again be applied at acceptable expense.

If the information signals $S_{xxx}(t)$ are video signals, a search pattern $S_{j,k,xxx}$ will be a sequence of several individual images, for example. A discontinuity is the lack of one or several images due to transmission disturbances, for example. The above-described iterative method of subdividing the characteristic vector $M_{j,xxx}$ into search patterns $S_{j,k,xxx}$ results in that $S_{j,k,xxx}$ consists of a portion before a discontinuity, whereas $S_{j,k+1,xxx}$ consists of a portion after it.

If the information signals $S_{xxx}(t)$ are audio or speech signals, a search pattern $S_{j,k,xxx}$ will be a sequence of subunits $U_{i,xxx}$, for example. A discontinuity is the lack of one or more subunits $U_{i,xxx}$ due to transmission disturbances, for example. The above-described iterative division methods result in that $S_{j,k,xxx}$ consists of the portion before a discontinuity, whereas $S_{j,k+1,xxx}$ consists of the portion after it.

Figure 4:
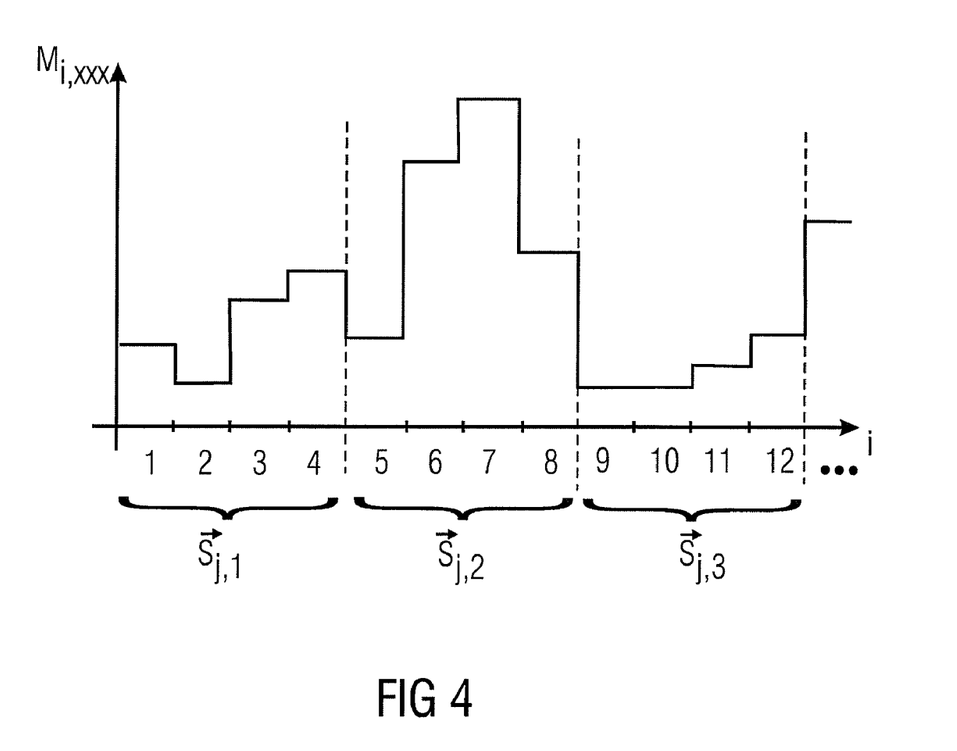
FIG. 4 shows a schematic representation of a characteristic curve in accordance with an embodiment of the present invention.

To further illustrate the subdivision of a characteristic vector $M_{j,xxx}$ into search patterns $S_{j,k,xxx}$, FIG. 4 schematically shows a curve of characteristic values $M_{i,j,xxx}$ for successive subportions $U_{i,xxx}$.

FIG. 4 shows a curve of characteristic values of twelve successive subunits $U_{i,xxx}$ (i=1, ..., 12), the subunits $U_{i,xxx}$ designating a sampling time or a subsequence of sampling times. The individual characteristic values shown in FIG. 4 are summarized into a characteristic vector $M_{j,xxx}$ for the characteristic j. In the scenario depicted in FIG. 4 by way of example, the characteristic vector $M_{j,xxx}$ is subdivided into equidistant portions of four subunits each so as to obtain three comparison time windows or search patterns $S_{j,k,xxx}$, each of which comprises four subunits, i.e. L=4. It shall be noted that FIG. 4 is merely an exemplary representation, and that a characteristic vector $M_{j,xxx}$ may generally also be subdivided in a different manner.

If the information signals are video signals, for example, and if the characteristic values $M_{i,j,xxx}$ are the total energy of an image, or frame, per sampling time i, the three search patterns $S_{j,k,xxx}$ shown in FIG. 4 will each have a total-energy curve of four successive frames. As was already described above, a temporal position or temporal alignment of the four successive frames, or of a search pattern $S_{j,k,deg}$, in relation to the characteristic vector $M_{j,ref}$ of the reference signal $S_{ref}(t)$ may be found by using the cross-correlation function CCF $(M_{j,ref}, S_{j,k,deg}, \lambda)$. Therefore, this represents coarse temporal alignment of four frames, or four subunits, respectively. If a search pattern generally comprises L subunits, a coarse temporal alignment of L subunits will take place, of course.

The cross-correlation function CCF$(M_{j,ref}, S_{j,k,deg}, \lambda)$ is only a measure of the similarity of the individual subspaces of the characteristic vectors $M_{j,xxx}$ and may also be replaced by other methods, for example. In accordance with further embodiments of the present invention, a further measure of a similarity of the individual subspaces of the characteristics vectors is the mean squared error, for example. Accordingly, coarse temporal alignment may also be performed using the minimum mean squared error method (MMSE).

If the cross-correlation function CCF$(M_{j,ref}, S_{j,k,deg}, \lambda)$ is used as a similarity measure, the position of the maximum of the cross-correlation function determines the shift of the search pattern $S_{j,k,deg}$ within the characteristic vector $M_{j,ref}$. The value of the maximum of the cross-correlation function CCF$(M_{j,ref}, S_{j,k,deg}, \lambda)$ is a measure of the match between $S_{j,k,deg}$ and the corresponding subspace from $M_{j,ref}$. This connection is schematically depicted in FIG. 5.

Figure 5:
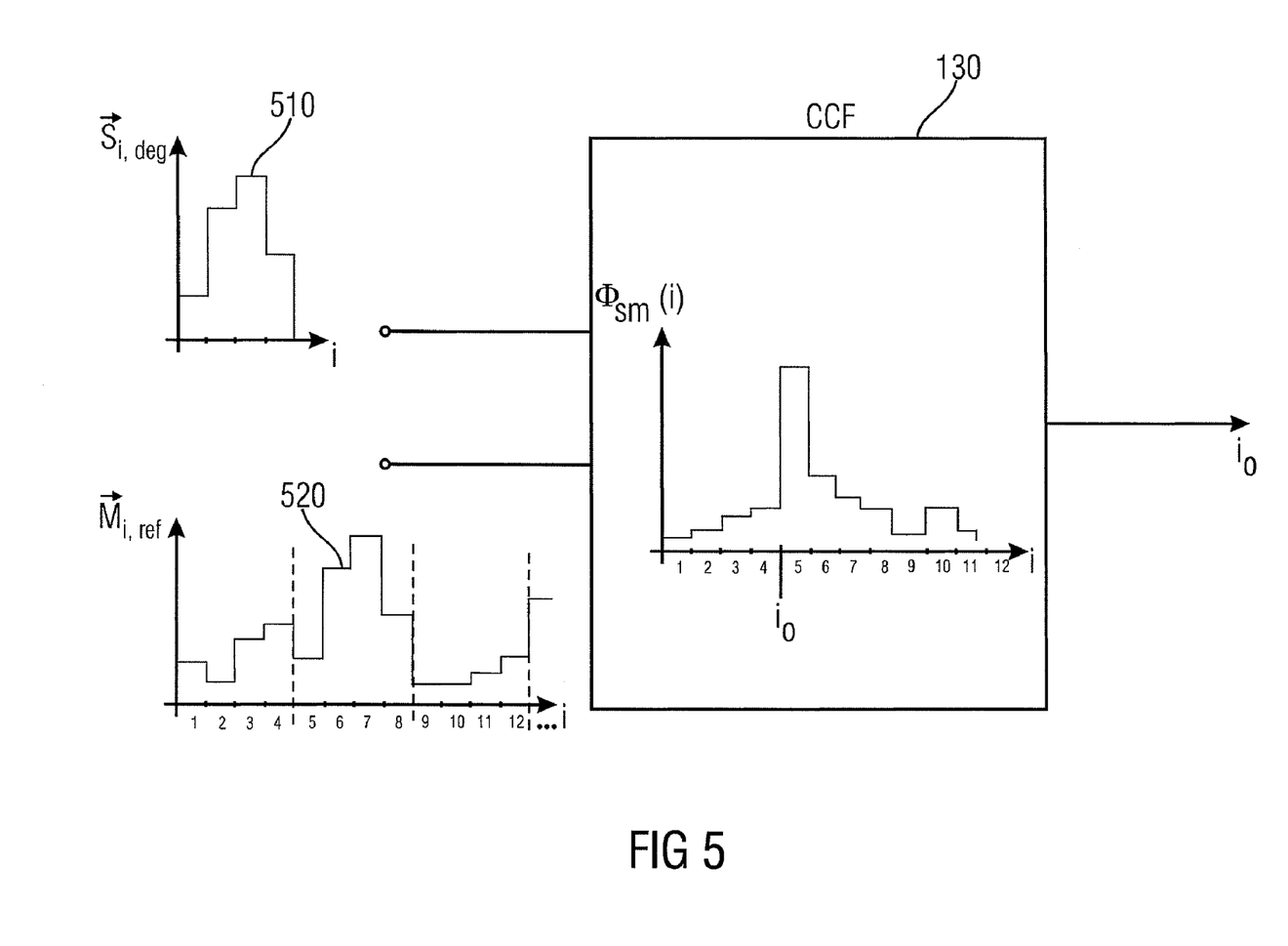
FIG. 5 shows a representation in order to illustrate the determination of the information for temporal alignment on the basis of a cross-correlation between first and second characteristic curves in accordance with an embodiment of the present invention.

FIG. 5 shows a means 130 for determining the information for temporal alignment on the basis of similarities between first 510 and second 520 characteristic curves in accordance with an embodiment of the present invention.

The first characteristic curve 510 corresponds to a search pattern $S_{j,k,deg}$, i.e. to a section of the characteristic vector $M_{i,deg}$. The second characteristic curve 520 corresponds to the characteristic vector $M_{j,ref}$ of the $j^{th}$ characteristic of the reference information signal $S_{ref}(t)$. The two characteristic curves 510 and 520 are fed to the means 130 for determining the information for temporal alignment. In accordance with an embodiment of the present invention, the means 130 for determining the information for temporal alignment utilizes the cross-correlation function CCF $(M_{j,ref}, S_{j,k,deg}, \lambda)$ of the two characteristic curves 510 and 520 as a measure of the similarity between the two characteristic curves 510 and 520, or $S_{j,k,deg}$ and $M_{j,ref}$.

As is schematically depicted in FIG. 5, the cross-correlation function of the two characteristic curves 510 and 520, or $S_{j,k,deg}$ and $M_{j,ref}$, may provide a maximum whose position determines the temporal shift of the search pattern $S_{j,k,deg}$ within the characteristic vector $M_{j,ref}$. In addition, the magnitude of the maximum of the cross-correlation function is a measure of the match of the search pattern $S_{j,k,deg}$ and the corresponding subspace of the characteristic vector $M_{j,ref}$. Thus, a large magnitude of the maximum signifies a very good match, whereas a relatively small value of the maximum indicates a relatively poor match and, therefore, a certain amount of unreliability.

If the search for a search pattern $S_{j,k,deg}$ obtained from the characteristic vector $M_{j,deg}$ is not successful, i.e. if the magnitude of the maximum of the cross-correlation function CCF $(M_{j,ref}, S_{j,k,deg}, \lambda)$ for the characteristic j is too small, the search will be repeated again, in accordance with an embodiment of the present invention, for a further characteristic j', provided that each subunit i was characterized by a plurality of characteristics. Therefore, $S_{j',k,deg}$ is searched for in $M_{j',ref}$.

In accordance with further embodiments of the present invention, the search pattern 510 may naturally also be formed from the characteristic vector $M_{j,ref}$ of the reference signal, i.e. $S_{j,k,ref}$, and may be searched for in the characteristic vector $M_{j,deg}$ of the disturbed signal $S_{deg}(t)$.

In accordance with a further embodiment of the present invention, the characteristic extraction means 120 may extract a characteristic from a plurality of characteristics, so that the characteristic will comprise characteristic properties which indicate, as compared to characteristic properties of other characteristics, an increased level of success in the search for a search pattern $S_{j,k,xxx}$ from one of the first and second characteristic curves and/or characteristic vectors $M_{j,xxx}$ of the characteristic. To this end, the characteristic extraction means 120 may be adapted to determine, as the characteristic property, a spread measure of the characteristic $M_{j,xxx}$ and/or of the characteristic vector $M_{j,xxx}$. Common examples of spread measures are, e.g., the variance or standard deviation, but other spread measures are also feasible.

If a characteristic curve or characteristic vector $M_{j,xxx}$ comprises a comparatively large spread range around its mean value, this may be seen as evidence suggesting that a search for a search pattern $S_{j,k,xxx}$ obtained from the characteristic vector $M_{j,xxx}$ will be more likely to be successful than a search for a search pattern $S'_{j,k,xxx}$ obtained from another characteristic vector $M'_{j,xxx}$, which comprises a lower spread range around its mean value.

By utilizing several characteristics for determining information in order to temporally align the first information signal and the second information signal, the information for temporal alignment may be determined efficiently and fast. The likelihood of obtaining a result may be considerably increased as compared to utilizing only one predetermined characteristic for determining the information for temporal alignment.

For example, a search for a search pattern $S_{j,k+1,deg}$ may be performed such that the search is started for that characteristic j for which the search for the temporally preceding search pattern $S_{j,k,deg}$ was successful or provided the highest correlation values. In this context it is assumed that between two temporally successive search patterns or comparison time periods $S_{j,k,xxx}$, $S_{j,k+1,xxx}$ the statistical characteristic properties of a characteristic j will undergo little change or no change at all, and that the characteristic j will maintain its validity or likelihood of a successful search. When considering comparison time periods $S_{j,k,xxx}$, $S_{j,k+\Delta k,xxx}$ which are further apart, the above assumption might possibly no longer be justified, so that characteristics which promise to yield the best search successes may change as a function of the time index k of the comparison time period.

Generally speaking, this means that for successive search patterns or comparison time periods different characteristics may be used in order to obtain a characteristic curve.

As was already mentioned above, the method of determining information in order to temporally align a first information signal and a second information signal in accordance with embodiments of the present invention serves to perform a coarse temporal search, the temporal resolution depending on the length L of the search patterns $S_{j,k,xxx}$. For a finer temporal alignment within the length L of the search pattern $S_{j,k,xxx}$, conventional methods such as block-matching algorithms or phase correlation may be employed, for example, at acceptable expense.

If, in accordance with the inventive concept, temporal alignment of all of the search patterns or comparison time windows $S_{j,k,xxx}$ between the disturbed signal and the undisturbed signal was performed, information will be available, as a result, which may be used for re-adapting the temporal structure of the transmitted or disturbed signal $S_{deg}(t)$ to the structure of the original or undisturbed signal $S_{ref}(t)$. As a side effect, this temporal information may also be employed for evaluating the transmission quality, in accordance with embodiments of the present invention. Specifically, if one finds, by using the inventive method, that the transmitted or disturbed signal $S_{deg}(t)$ is only slightly delayed or comprises few defects, one may assume in this case that a transmission quality was relatively high. However, if a transmitted signal $S_{deg}(t)$ exhibits a long delay time, or if a correspondingly large number of signal fragments are missing, i.e. if there are many discontinuities, this indicates a relatively poor transmission quality.

Figure 6:
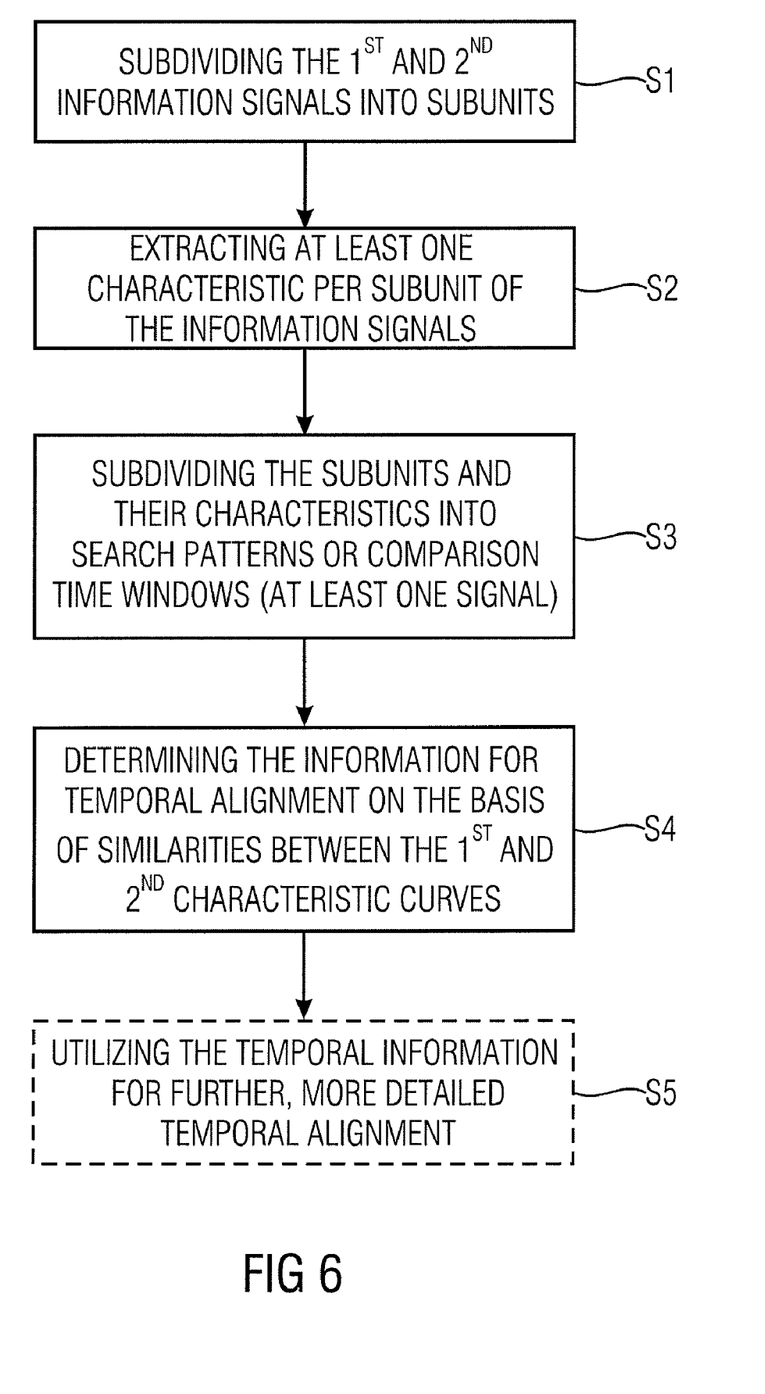
FIG. 6 shows a flowchart in order to illustrate a method of determining information in order to temporally align a first information signal and a second information signal in accordance with an embodiment of the present invention.

In summary, FIG. 6 schematically shows a flowchart of a method of determining information in order to temporally align a first information signal and a second information signal, which method is performed, in accordance with an embodiment of the present invention, within the apparatus 110 for determining information.

The flowchart depicted in FIG. 6 comprises a first step S1, a subsequent step S2, a further step S3, a step S4, and an optional step S5.

In the method shown for determining information for temporal alignment, in accordance with an embodiment of the present invention, the first step S1 comprises subdividing the first and second information signals, or the disturbed $S_{deg}(t)$ and the undisturbed information signal $S_{ref}(t)$, into subunits $U_{i,xxx}$, respectively, the subunits corresponding to sampling times i or subsequences i of sampling times.

In the second step S2, each subunit $U_{i,xxx}$ is characterized by at least one characteristic $M_{i,xxx}$. Thus, each subunit $U_{i,xxx}$ of the first and second information signals has a characteristic or a plurality of j characteristics associated with it. In this context, the resulting characteristic sets are summarized into characteristic vectors $M_{i,xxx}$ and $M_{j,xxx}$, respectively. A characteristic vector $M_{j,xxx}$ therefore comprises, for example, one characteristic characteristic j, respectively, for all of the subunits $U_{i,xxx}$ of the first and second information signals, respectively.

In the third step S3, a characteristic vector $M_{j,xxx}$, or the plurality of characteristic vectors $M_{xxx}$, regarding at least one of the two information signals is/are subdivided into search patterns or comparison time windows $S_{j,k,xxx}$. In this context, a comparison time window $S_{j,k,xxx}$ comprises several sampling times i or subsequences i of sampling times, for example.

In the subsequent step S4, the individual search patterns $S_{j,k,xxx}$ of the one information signal are then searched for within the corresponding characteristic vector $M_{j,xxx}$ of the other information signal so as to obtain information for temporal alignment on the basis of similarities between the first and second characteristic curves. In this context, a cross-correlation function between the two characteristic curves may be used, for example, as was already described above.

Since step S4 has provided information for temporal alignment on the basis of similarities between the first $S_{j,k,xxx}$ and the second $M_{j,xxx}$ characteristic curves, this temporal information may be utilized, in an optional step S5, for temporally aligning the two information signals further, i.e. in a more detailed manner, with each other. This may be performed, for example, using conventional methods such as block matching or phase correlation, but with the advantage, in this case, that the alignment may be performed in more detail merely within a shift range between that part of the first and second information signals which corresponds to the search pattern or the characteristic curve of the first and second information signals, respectively, and which lies within a predetermined range around the shift value λ obtained in step S4. The detailed alignment in step S5 in this context is based, for example, on finding similarities between the information values of the two information signals to be aligned with each other, such as the pixel values of the respective images, or at least part of the information values per subunit $U_{i,xxx}$, such as a frame, in which case said part will then advantageously take up a larger data volume than the characteristic value $M_{i,j,xxx}$ per subunit $U_{i,xxx}$. For example, the sum of the mean square errors between the video sequences of the search patterns or of the characteristic curve for image-wise shifts around the coarse shift value λ is determined from step S4, and the finer shift value is determined to be that value which leads to the smallest square error. In this context, the coarse shift value λ may comprise, for example, a granularity of two frames, corresponding to subunits $U_{i,xxx}$ and characteristics $M_{i,j,xxx}$ from two frames, whereas the finer shift value comprises, for example, a granularity of one frame.

In accordance with further embodiments of the present invention, individual steps may be dispensed with, or be optional, in the method schematically depicted in FIG. 6. For example, step S1 is optional when a subdivision into subunits $U_{i,xxx}$ is already inherent in the signal structure of $S_{deg}(t)$ and/or $S_{ref}(t)$, as it may be the case, for example, with video sequences, where individual frames or images in each case correspond to the subunits $U_{i,xxx}$. In accordance with embodiments of the present invention, step S3 may also be dispensed with, for example when the characteristic vectors $M_{j,deg}$ and $M_{j,ref}$ are directly correlated with one another so as to establish a temporal shift λ between $M_{j,deg}$ and $M_{j,ref}$, or when $M_{j,deg}$ and $M_{j,ref}$ are iteratively divided so as to obtain suitable search patterns $S_{j,k,xxx}$, as was already described above.

Therefore, the inventive concept may be used for subdividing a search for similar portions from a disturbed data stream $S_{deg}(t)$ and an undisturbed data stream $S_{ref}(t)$ into two phases. During the first phase, a coarse search, it is not the data streams themselves that are examined, but rather characteristics $M_{i,j,xxx}$ obtained from the data streams. Because of the resulting reduction in complexity, a big advantage may be achieved with regard to the computing time entailed. The reliability may be increased even further in that not only one characteristic is used, but rather a plurality of characteristics, and in that the most suitable characteristic is selected for each portion. Since the search range may be clearly limited in this manner, the second phase may comprise conducting a fine search, wherein conventional methods such as block matching or phase correlation may be employed. However, since the search range in the second phase is now small, the computing time entailed is less critical to make up for it.

Only as a precaution shall it be noted that the preceding embodiments were based on the assumption, to facilitate understanding, of an undisturbed reference signal $S_{ref}(t)$ and a disturbed signal $S_{deg}(t)$ as being mutually aligned signals. The alignment of two disturbed or two undisturbed information signals is also possible, however. In addition, as was already mentioned above, different characteristics may be utilized for coarse alignment, such as the (band) energy in the event of an audio signal, and the brightness, the color, the contrast or edge information, i.e. information on the high-frequency portion of the image, in the event of a video signal. In the event of a video signal, these characteristics may be obtained either across the entire image area or only across one or several sections, it being possible, again, in the event of section-wise capture and of extracting several characteristics, for the extraction sections of different characteristics to be different. In addition, the possibilities of a similarity measure which were mentioned in connection with the coarse alignment, namely the cross-correlation and the RMSE, were only exemplary examples of the similarity search, and naturally there are other possibilities, such as SDA (squared absolute difference) methods. The same applies to fine alignment. The possibilities of a similarity measure which were mentioned in connection with fine alignment, namely block matching and phase correlation, also represent only exemplary examples in addition to other possibilities, such as SDA (squared absolute difference) methods. As a precaution only, it shall be noted that the term "audio signal" is to mean any signals which relate to acoustic information, i.e. not only pieces of music, but also speech signals.

In accordance with embodiments of the present invention, it is the objective of the present invention not to generate a precisely defined temporal structure from any signal, but the issue is rather to adapt the temporal structure of a disturbed signal $S_{deg}(t)$ to the structure of an original, undisturbed signal $S_{ref}(t)$, i.e. to restore the original state, as it were. Conventional technology has known methods, all of which are subject to large-scale restrictions, since they will either fail in the presence of large-scale disturbances, or they can only be applied to specific signals. In addition, with known methods the computing expenditure is prohibitive. The fundamental difference between known concepts and the inventive concept is the transition from analyzing the actual signal information (large amount of data) to analyzing meta-information (characteristic vectors, small amount of data). The reduction of the computing expenditure associated therewith also entails an increase in accuracy, since the meta-information may be adapted to the task set in a considerably more specific manner than is enabled by a direct comparison of two information blocks.

In other words, the embodiments thus provide a method which is suitable for associating similar portions of two or more information streams, even with discontinuous curves of the information streams. The information streams are subdivided into portions, it being possible for each portion to be described by one or more characteristics. This causes a reduction of the information that may be used for future analysis. The portions of one information stream are searched for in the non-subdivided characteristic vector of the other information stream by means of a similarity analysis for a coarse search. In this context, one or more characteristics may be employed in the search. Alternatively, in accordance with an embodiment of the present invention, it is also possible to subdivide both characteristic vectors of both information streams into portions. While temporal association of the two information streams was achieved by performing the similarity analysis of the characteristic vectors, conventional methods may be employed for a fine search, or for fine temporal association of the information streams.

In accordance with embodiments of the present invention, the information on the change in the temporal association caused by the transmission may be used for evaluating the quality of the transmission. In this context it is to be stressed that the inventive concept is independent of the type of information. The search for similar data stream portions is not performed by using the data itself, but is performed by means of analyzing meta-information or characteristics obtained from the data.

Depending on the circumstances, the inventive method for determining the information in order to temporally align a first information signal and a second information signal may be implemented in hardware or in software. Implementation may be performed on a digital storage medium, in particular a disc or CD having electronically readable control signals which may cooperate with a programmable computer system such that the method is performed. Thus, the invention generally also consists in a computer program product having a program code, stored on a machine-readable carrier, for performing the inventive method, when the computer program product runs on a computer. In other words, the invention may therefore be realized as a computer program having a program code for performing the method of determining information in order to temporally align a first information signal and a second information signal, when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for determining information in order to temporally align a first information signal and a second information signal, each of which comprises one or several information values for successive sampling times, the apparatus comprising a characteristic extractor for extracting a characteristic per sampling time or per subsequence of sampling times of the successive sampling times from the first information signal within a first search pattern so as to obtain a first characteristic curve, and for extracting the characteristic per sampling time or per subsequence of sampling times of the successive sampling times from the second information signal within a second search pattern so as to obtain a second characteristic curve, the characteristic extractor being configured to extract the characteristic from a plurality of characteristics per sampling time or per subsequence of sampling times, so that the characteristic comprises characteristic properties which by comparison with characteristic properties of other characteristics indicate an increased level of success in the search for the search pattern from one of the first and second characteristic curves of the characteristic; and a determiner for determining the information for temporal alignment on the basis of similarities between the first and second characteristic curves by means of a first search for a search pattern from one of the first and second characteristic curves within the other of the first and second characteristic curves.

2. The apparatus as claimed in claim 1, wherein the first and second information signals each are a digital video signal comprising the pixel values of a video image as the plurality of information values per sampling time.

3. The apparatus as claimed in claim 1, wherein the search for a search pattern will not be successful when a magnitude of the maximum of a correlation function between the search pattern and the characteristic curve of the second or first characteristic curve is too small for the characteristic determined.

4. The apparatus as claimed in claim 1, wherein the characteristic extractor is adapted to determine a spread measure of the characteristic as a characteristic property.

5. The apparatus as claimed in claim 1, wherein the extracted characteristics relate to energy, brightness, color, contrast, or edge information.

6. The apparatus as claimed in claim 1, wherein the extracted characteristic corresponds to a total energy comprised within the first or second information signals, respectively, per sampling time or per subsequence of sampling times.

7. The apparatus as claimed in claim 1, wherein the extracted characteristic corresponds to an energy comprised within the first and second information signals, respectively, within a predetermined spectral range per sampling time or subsequence of sampling times.

8. The apparatus as claimed in claim 1, wherein the first and second information signals each are a digital video signal comprising the pixel values of a video image as the plurality of information values per sampling time, and wherein the extracted characteristic corresponds to a share in movement of an image area between two successive video images.

9. The apparatus as claimed in claim 1, wherein the characteristic extractor is configured such that a totality of characteristics per sampling time or per subsequence of sampling times is less comprehensive than a totality of the information values of the first and second information signals, respectively, per sampling time or per subsequence of sampling times from which same are extracted.

10. The apparatus as claimed in claim 1, wherein the determiner for determining the information for temporal alignment is configured to determine the similarities between the first and second characteristic curves of the characteristic by means of a correlation function between the first and second characteristic curves.

11. The apparatus as claimed in claim 10, wherein a position of the maximum of the correlation function between the first and second characteristic curves of the characteristic indicates a mutual temporal shift of the two characteristic curves.

12. The apparatus as claimed in claim 10, wherein the determiner for determining the information for temporal alignment is configured to determine a discontinuity of the first or second characteristic curve of the characteristic by means of an occurrence of multiple maxima of the correlation function between the first and second characteristic curves, a discontinuity corresponding to a lack of information values of the first information signal relative to the second information signal, or vice versa, between two successive sampling times.

13. The apparatus as claimed in claim 10, wherein the determiner for determining the information for temporal alignment is configured to determine a discontinuity of the first or second characteristic curve of the characteristic by means of the value of the maximum of the correlation function or of the magnitude of the correlation function between the first and second characteristic curves, a discontinuity corresponding to a lack of information values of the first information signal relative to the second information signal, or vice versa, between two successive sampling times.

14. The apparatus as claimed in claim 12, wherein the determiner for determining the information for temporal alignment is further configured to subdivide the first or second search patterns instead of the discontinuity determined into two smaller search patterns, respectively, and to again perform an alignment with regard to the smaller search patterns.

15. The apparatus as claimed in claim 1, wherein the determiner for determining the information for temporal alignment is configured to determine the similarities between the first and second characteristic curves of the characteristic on the basis of the mean square errors between the first and second characteristic curves.

16. The apparatus as claimed in claim 1, further comprising:
    an aligner for temporally aligning, in more detail, the first and second information signals within the first or second search pattern on the basis of the information for temporal alignment on the basis of similarities between the first and second characteristic curves of the characteristic.

17. The apparatus as claimed in claim 16, wherein the aligner for temporally aligning, in more detail, is configured to perform a more detailed temporal alignment by means of block matching or SAD algorithms or correlation algorithms or by means of a phase correlation within a time period predefined by the information for temporal alignment.

18. The apparatus as claimed in claim 1, wherein the information for temporal alignment may be employed in addition to an evaluation of a transmission quality of a transmission between the first and second information signals.

19. A method of determining information in order to temporally align a first information signal and a second information signal, each of which comprises one or several information values for successive sampling times, the method comprising:
    extracting a characteristic per sampling time or per subsequence of sampling times of the successive sampling times from the first information signal within a first search pattern so as to obtain a first characteristic curve, and for extracting the characteristic per sampling time or per subsequence of sampling times of the successive sampling times from the second information signal within a second search pattern so as to obtain a second characteristic curve,
    the characteristic being extracted from a plurality of characteristics so that the characteristic comprises characteristic properties which by comparison with characteristic properties of other characteristics indicate an increased level of success in the search for the search pattern from one of the first and second characteristic curves of the characteristic; and
    determining the information for temporal alignment on the basis of similarities between the first and second characteristic curves of the characteristic by means of a first search for a search pattern from one of the first and second characteristic curves of the characteristic within the other of the first and second characteristic curves of the characteristic.

20. A non-transitory computer-readable medium having stored thereon a computer program for performing the method of determining information in order to temporally align a first information signal and a second information signal, each of which comprises one or several information values for successive sampling times, the method comprising:

extracting a characteristic per sampling time or per subsequence of sampling times of the successive sampling times from the first information signal within a first search pattern so as to obtain a first characteristic curve, and for extracting the characteristic per sampling time or per subsequence of sampling times of the successive sampling times from the second information signal within a second search pattern so as to obtain a second characteristic curve, the characteristic being extracted from a plurality of characteristics so that the characteristic comprises characteristic properties which by comparison with characteristic properties of other characteristics indicate an increased level of success in the search for the search pattern from one of the first and second characteristic curves of the characteristic; and determining the information for temporal alignment on the basis of similarities between the first and second characteristic curves of the characteristic by means of a first search for a search pattern from one of the first and second characteristic curves of the characteristic within the other of the first and second characteristic curves of the characteristic, when the computer program runs on a computer.

\* \* \* \* \*